United States Patent [19]

Warshawsky et al.

[11] Patent Number: 5,595,212
[45] Date of Patent: Jan. 21, 1997

[54] WALL MOUNT INLET STOP SYSTEM

[75] Inventors: Jerome Warshawsky, Hewlett Harbor; Frank Antoniello, Commack, both of N.Y.

[73] Assignee: I. W. Industries, Inc., Melville, N.Y.

[21] Appl. No.: 545,243

[22] Filed: Oct. 19, 1995

[51] Int. Cl.⁶ ........................................ F16L 5/00
[52] U.S. Cl. ........................... 137/360; 137/359; 251/148
[58] Field of Search .................................. 137/359, 360; 251/148

[56] References Cited

U.S. PATENT DOCUMENTS

| | | | |
|---|---|---|---|
| 980,880 | 1/1911 | Mueller | 137/359 |
| 1,538,284 | 5/1925 | Glauber | 137/359 |
| 1,639,248 | 8/1927 | Zolleis | 137/359 |
| 1,654,550 | 1/1928 | Muend | 137/359 |
| 4,662,389 | 5/1987 | Igbal | 137/359 |

OTHER PUBLICATIONS

Modern Line, advertisement, 1995.
F. Waste & Supply Systems, Broadway Collection, "Supply Stops & Nipples", 1995.

*Primary Examiner*—A. Michael Chambers
*Attorney, Agent, or Firm*—Alfred M. Walker

[57] ABSTRACT

An improved inlet stop fixture for conventional hot and cold inlets to plumbing fixture which is threaded onto a male pipe thread with a nipple, to prevent a gap of uncontrolled length from the fixture to the wall. The improved inlet stop system includes a new intermediate element, namely a water inlet tube extension, which fits between the conventional pipe nipple and the valve fixture itself. The inlet tube extension includes an inlet coupling section, an O-ring collar, with an O-ring, and a fixture coupling threaded nipple at the far end. The water inlet tube extension is threaded onto the nipple that extends through the wall. Alternately, a non-threaded solder type connection water inlet tube extension may be connected to a non-threaded copper tube for a solder connection. In either embodiment, the inner O-ring is provided in a groove to produce a sliding fit over the body of the valve fixture. An inlet stop fixture fits over the water inlet tube extension, with a large bore area that fits loosely over the inlet coupling region of the water inlet tube extension.

6 Claims, 7 Drawing Sheets

WALL MOUNT INLET STOP SYSTEM

FIELD OF THE INVENTION

The present invention relates to wall mounted plumbing inlet stops.

BACKGROUND OF THE INVENTION

Plumbing installations often require inlet stops to shut off the hot and cold water supply to fixtures requiring service, which are attached to nipples protruding through vertical walls. Whether the attachment is via pipe threads or solder joint, the neat appearance of the installation is often marred by a gap between the inlet stop and the wall. It is difficult to control the size of the gap. Prior art escutcheons have been used to mask the situation in some installations, but their use has been an imperfect solution.

OBJECTIONS OF THE INVENTION

It is therefore an object of this invention to eliminate poor fitting inlet stop-to-wall installations.

It is a further object to create a inlet stop that is easy to install.

It is a further object to create a system whereby the same inlet stop is used regardless of the type of attachment to the water supply nipples protruding through the wall.

It is a further object to provide an intermediate element that attaches to the water supply via pipe threads.

It is a further object to provide an intermediate element that attaches to the water supply via a solder connection with a feature that reduces installation time and effort.

It is yet another object of the present invention to improve over the disadvantages of the prior art.

SUMMARY OF THE INVENTION

In keeping with these objects and others, which may become apparent, the present invention includes an improved inlet stop for a conventional inlet stop which is threaded onto a male pipe thread with a nipple, to prevent a gap of uncontrolled length from the fixture to the wall.

The improved inlet stop system includes a new intermediate element, namely a water inlet tube extension, which fits between the conventional pipe nipple and the valve fixture itself. The inlet tube extension includes an inlet coupling section, an O-ring collar, with an o-ring, and a fixture coupling threaded nipple at the far end. The water inlet tube extension is threaded onto the nipple that extends through the wall. The inner O-ring is provided in a groove to produce a sliding fit in the body of the inlet stop fixture.

An inlet stop body fits over the water inlet tube extension, with a large bore area that fits loosely over the inlet coupling region of the water inlet tube extension. The inlet stop fixture includes female threads that mate with the fixture coupling threads of the extension.

The coupling to the valve body can be accomplished without the need for tools therefore there is no chance of scratching the surface; the valve is simply threaded far enough to close the wall gap. A set screw is used to lock the setting against the outer surface of the inlet coupling section of the tube extension.

Alternately, the improved fixture assembly can also attach to an unthreaded copper tube extending from the wall, such as a a ½" sweat coupling. The water inlet tube extension is different when used for the solder connection, however, the front end coupling to the valve assembly is identical. A solder hole is provided in the extension. This places the solder application away from the wall and reduces the chances of heat damage to the wall surface. After the water inlet extension is soldered, an O-ring is replaced prior to twisting the inlet stop body fixture on as described above.

The extension of the present invention conveniently attaches an inlet stop fixture to a nipple protruding through a vertical wall without an undesirable gap between the fixture and the wall.

The present invention eliminates poor fitting stop-to-wall installations, and creates an inlet stop fixture that is easy to install with an intermediate element that attaches to the water supply via pipe threads or a copper tube.

The intermediate element of the present invention attaches to a water supply via a connection with an installation that reduces time and effort.

DESCRIPTION OF THE DRAWINGS

The present invention can best be understood in conjunction with the accompanying drawings, in which.

DETAILED DESCRIPTION OF THE PREFERRED EMBODIMENT

Figures 1, 2:
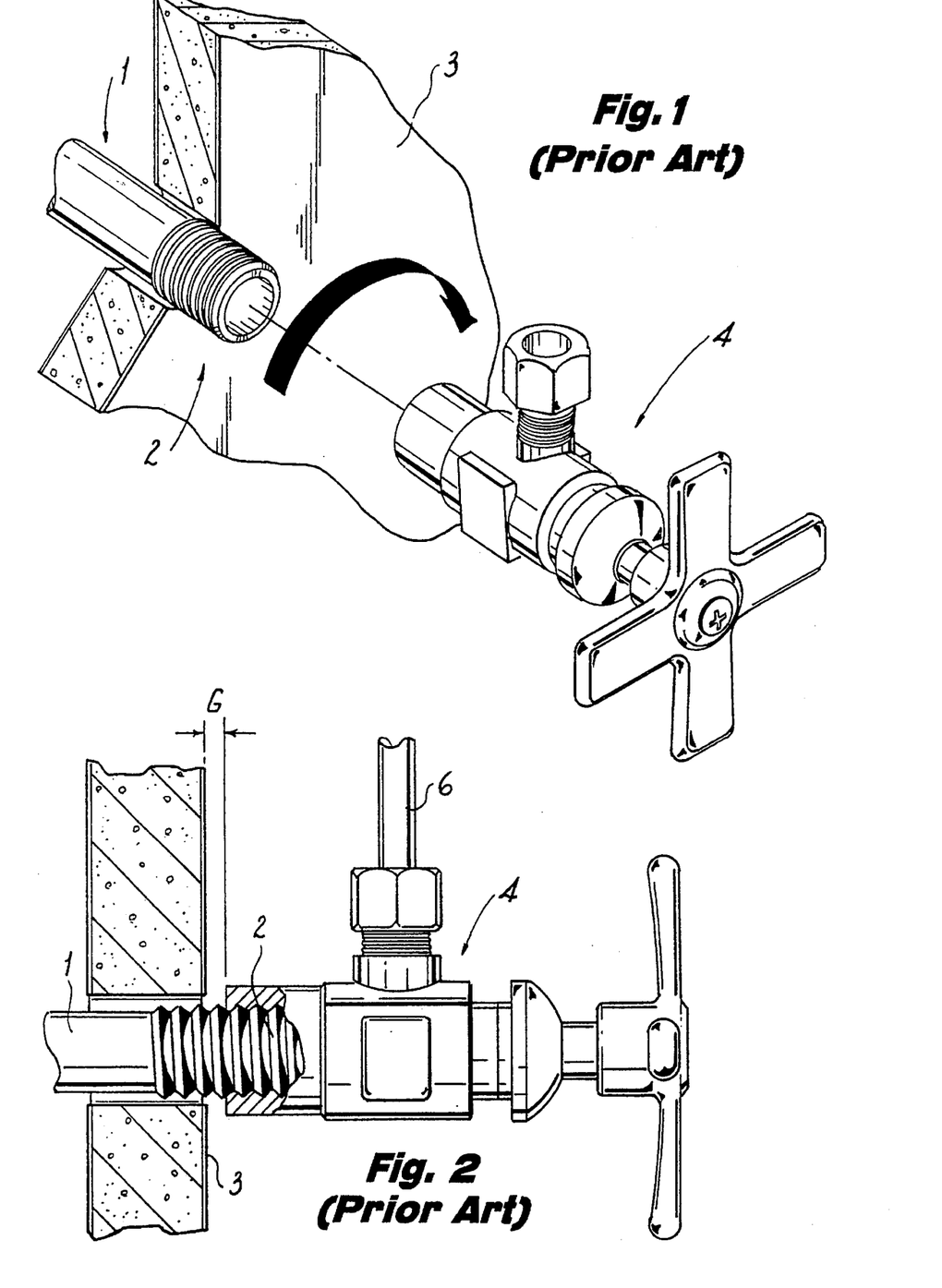
FIG. 1 is a perspective view of a prior art inlet stop assembly.
FIG. 2 is a side elevational view in cross section of the prior art inlet stop installation as in FIG. 1.

FIG. 1 shows a conventional nipple 1 with a male pipe thread 2, such as a ½" NPT protruding from a wall 3. An inlet stop fixture 4 is threaded onto nipple 1 to complete the installation.

What usually results is an undesirable gap "G" of uncontrolled length from inlet stop fixture 4 to the wall 3, as shown in FIG. 2. This is due, in part, from the vertical extension 6 that is part of the inlet stop fixture 4. The inlet stop fixture 4 must be threaded onto the pipe threads 2 tight enough to eliminate joint leakage, but also in such a manner that the vertical extension 6, or riser, ends up in a vertical orientation.

The gap length "G" is usually sacrificed as a parameter to be controlled in view of these more stringent constraints.

Although escutcheons have sometimes been used to hide the gap "G", they are often ill fitting stampings with limited gap-range covering capability. Also, since a wrench must be used on the inlet stop fixture 4 to torque it properly, the wrench flat area is often scratched in the process. Obviously, a different part number or variety of inlet stop fixture 4 is required if the only difference is the type of attachment to the wall, such as solder.

Figure 3:
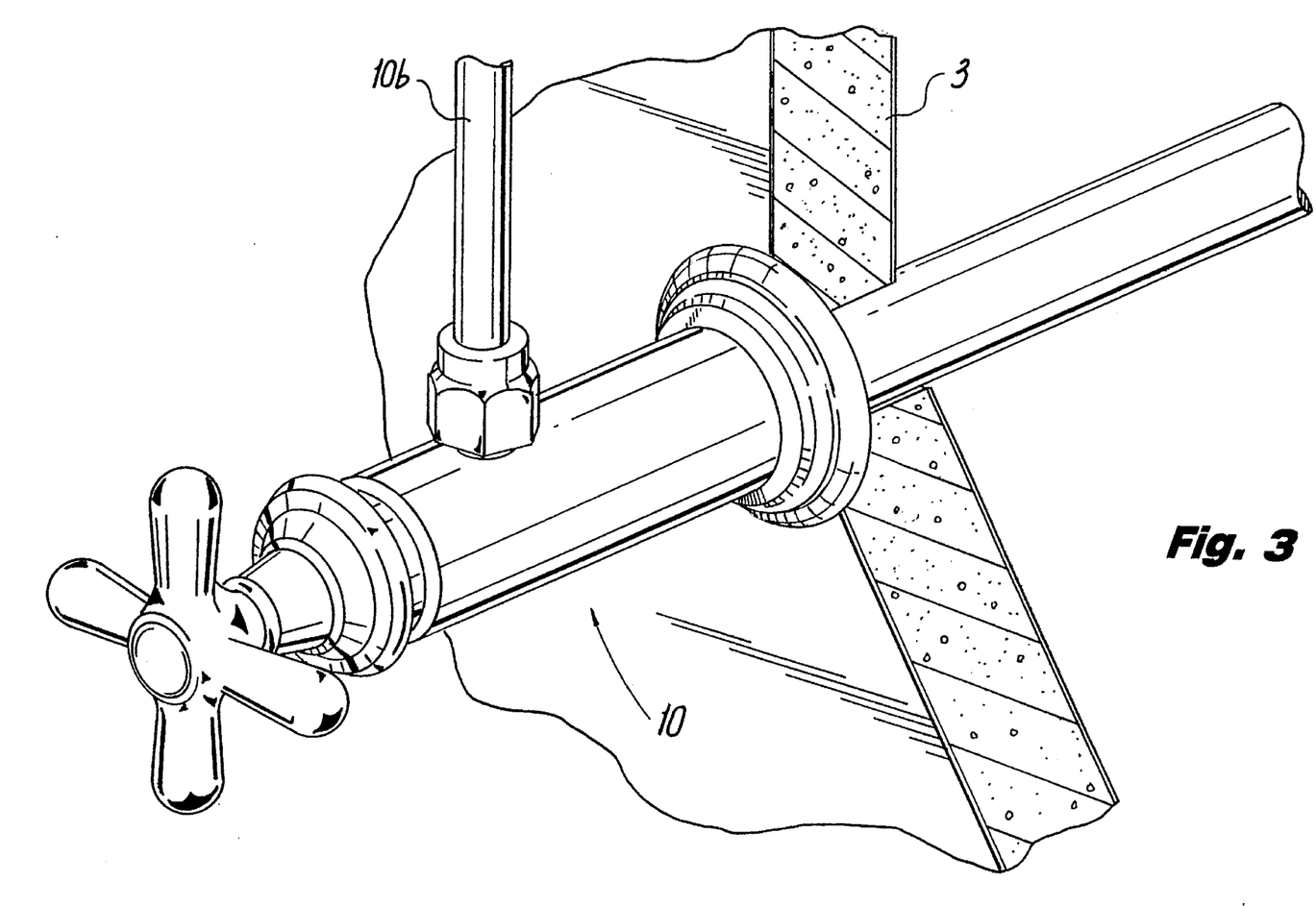
FIG. 3 is a perspective view of the improved inlet stop installation of the present invention.
Figure 4:
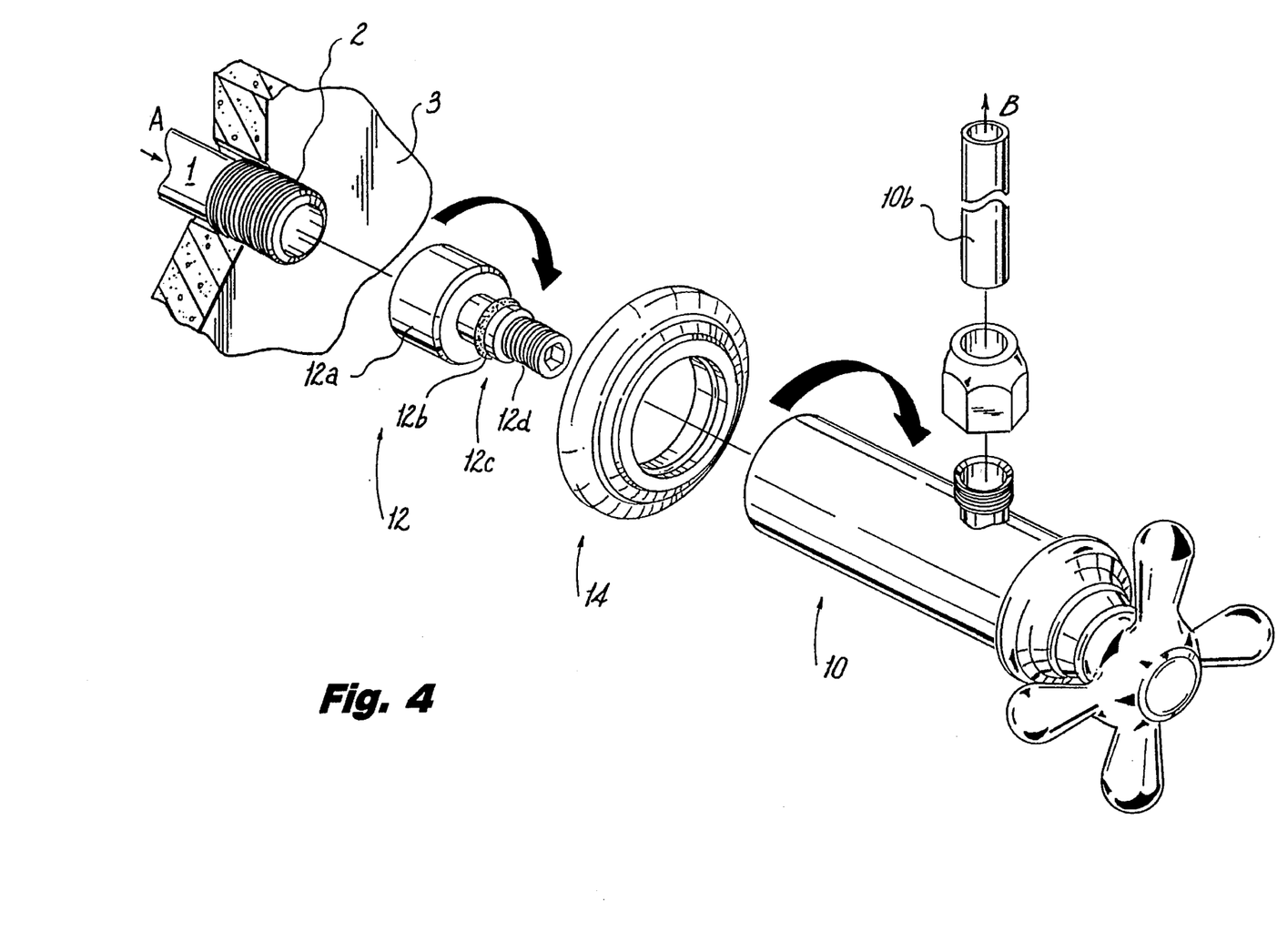
FIG. 4 is an exploded perspective view of a pipe thread embodiment of the improved inlet stop assembly of the present invention.

By contrast, FIG. 3 shows a completed installation of the improved inlet stop of the present invention. FIG. 4 shows a exploded view of the improved inlet stop system.

An intermediate element has been added, such as water inlet tube extension 12, which fits between the pipe nipple 1 and inlet stop body 10 itself, which inlet stop body 10, shown in FIG. 4, is designed for attachment to conventional pipe threads 2. An escutcheon 14 is also part of the assembly.

Extending upward from inlet stop body 10 is hollow riser tube 10b, which riser tube 10b is a connection between inlet stop body 10 and a conventional faucet, toilet or other plumbing fixture. Water flows into pipe thread nipple 1 from the direction indicated by arrow "A" through to water inlet tube extension 12 to inlet stop body 10 and then out through riser tube 10b to a conventional faucet, toilet or other plumbing fixtures, in the direction indicated by arrow "B".

Figure 5:
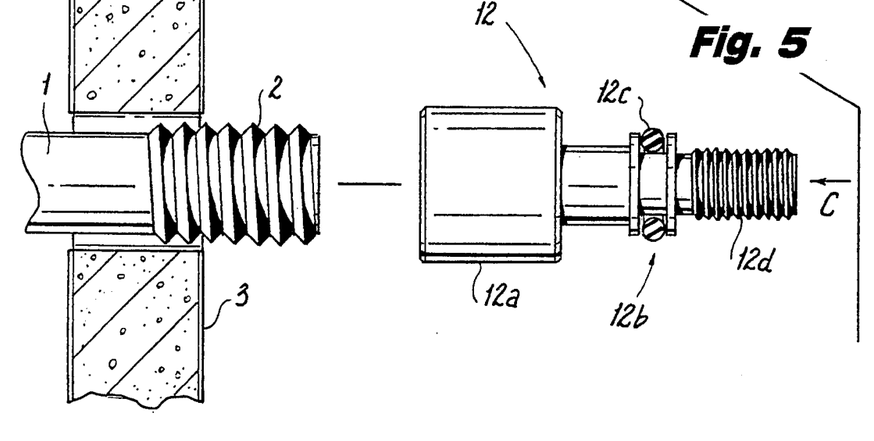
FIG. 5 is an exploded side elevational view in partial section of the embodiment as in FIG. 3.

FIG. 5 is a close-up of the water inlet tube extension 12, including an inlet coupling section 12a, an O-ring collar 12b, with O-ring 12c, and a fixture coupling threaded nipple 12d at the far end.

Figure 6:
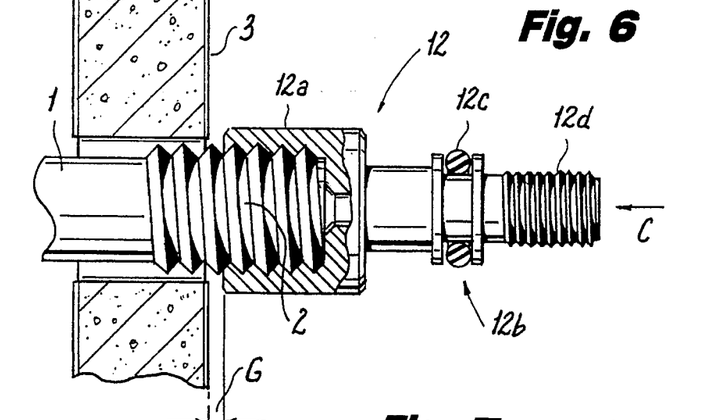
FIG. 6 is a side elevational view in cross section of the assembled water inlet tube extension as in FIG. 3.

FIG. 6 shows water inlet tube extension 12 threaded onto the nipple 1 that extends through the wall 3. A hex wrench is used to torque water inlet tube extension 12 onto nipple 1 through a female hexagon feature without regard to marring the surface thereof, since the entire water inlet tube extension 12 is covered by the body of valve body 10. The female hexagon wrench (not shown) is inserted into fixture coupling threaded nipple 12d of inlet tube extension 12 in the direction indicated by arrow "C" in FIGS. 5 and 6.

Figure 7:
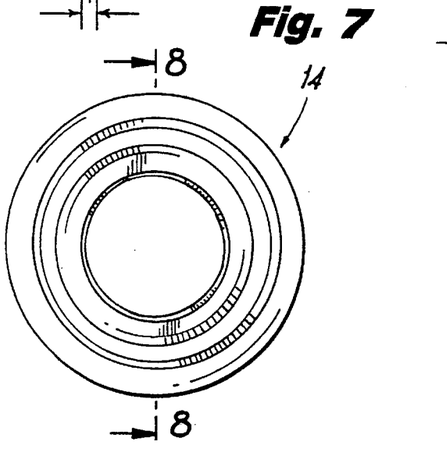
FIG. 7 is an elevational front view of the escutcheon portion of the water inlet tube extension as in FIG. 3.
Figure 8:
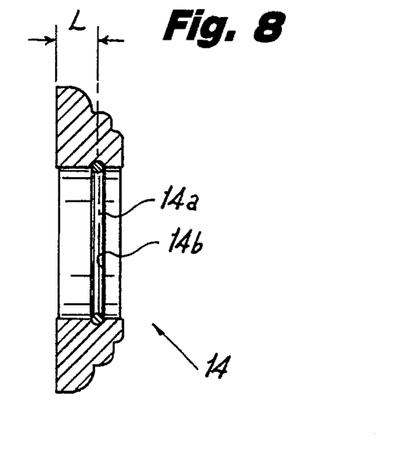
FIG. 8 is a side elevational view in cross section of the escutcheon as in FIG. 7.

FIG. 7 shows a front view of escutcheon 14. FIG. 8, a side view cross section, reveals an inner O-ring 14a in a groove 14b within escutcheon 14. This produces a sliding fit of escutcheon 14 over the body of valve fixture 10. Escutcheon 14 has significant length with the dimension denoted as "L" equal to or greater than the range of wall gap "G" that can be hidden by escutcheon 14. Normally a gap up to a ⅜ inch can be accommodated. Furthermore, part of gap "G" can be hidden by a proximal end of inlet stop body 10 adjacent to wall 3.

Figures 9, 10:
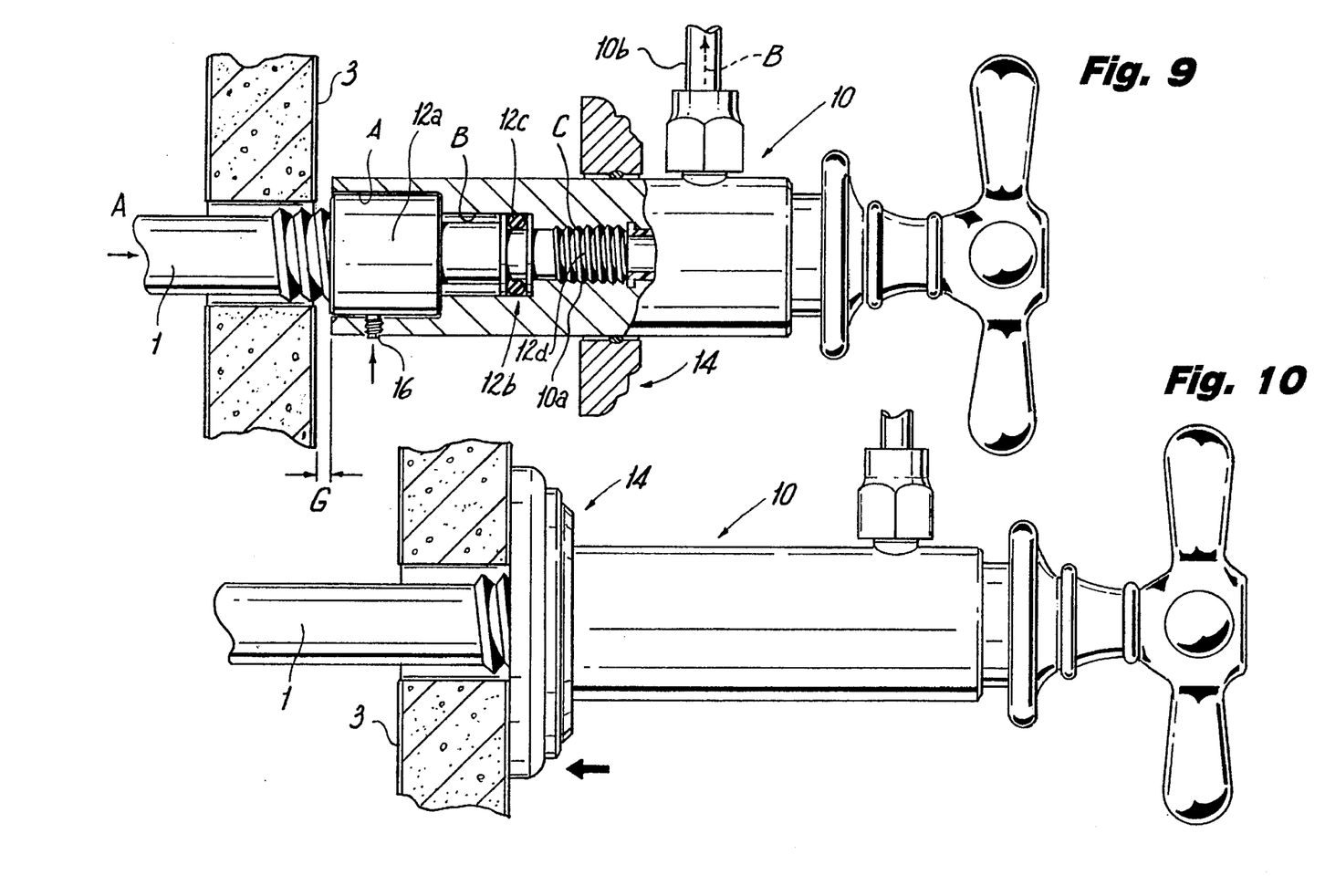
FIG. 9 is a side elevational view in cross section of the installation of the water inlet tube extension as in FIG. 3.
FIG. 10 is a side elevational view of the completed installation of the water inlet tube extension as in FIG. 3.

FIG. 9 is a side view cross section of inlet stop fixture 10 as it fits over water inlet tube extension 12. Region "A" is a large bore area that fits loosely over the inlet coupling region 12a of water inlet tube extension 12. Set screw 16 is used to prevent rotation of inlet stop body 10 when inlet stop body 10 is properly aligned.

Further along the inlet stop body 10 of inlet stop fixture is a smooth accurate bore, region "B", which creates a water tight seal against O-ring 12c of water inlet tube extension 12 by compressing its cross section against the root of O-ring collar 12b of water inlet tube extension 12 in a sliding seal which can accommodate length fit variations.

Finally, in region "C", there is provided female threads 10a that mate with male fixture coupling threads 12d of water inlet tube extension 12. Threads 10a are not pipe threads; rather, threads 10a are straight threads which are not for sealing, since O-ring 12c does that. The coupling of water inlet tube extension 12 to the body of inlet stop fixture 10 can be accomplished without the need for tools. Therefore there is no chance of scratching the surface and inlet stop body 10 is simply threaded far enough to close a conventional wall gap and properly align vertically extending riser 10b to a faucet, toilet or other plumbing fixture (not shown). Set screw 16 is then used to lock the setting against the outer surface of inlet coupling section 12a of water inlet tube extension 12.

FIG. 10 shows how the installation is completed by sliding escutcheon 14 from its position during the installation to the wall 3.

Figure 11:
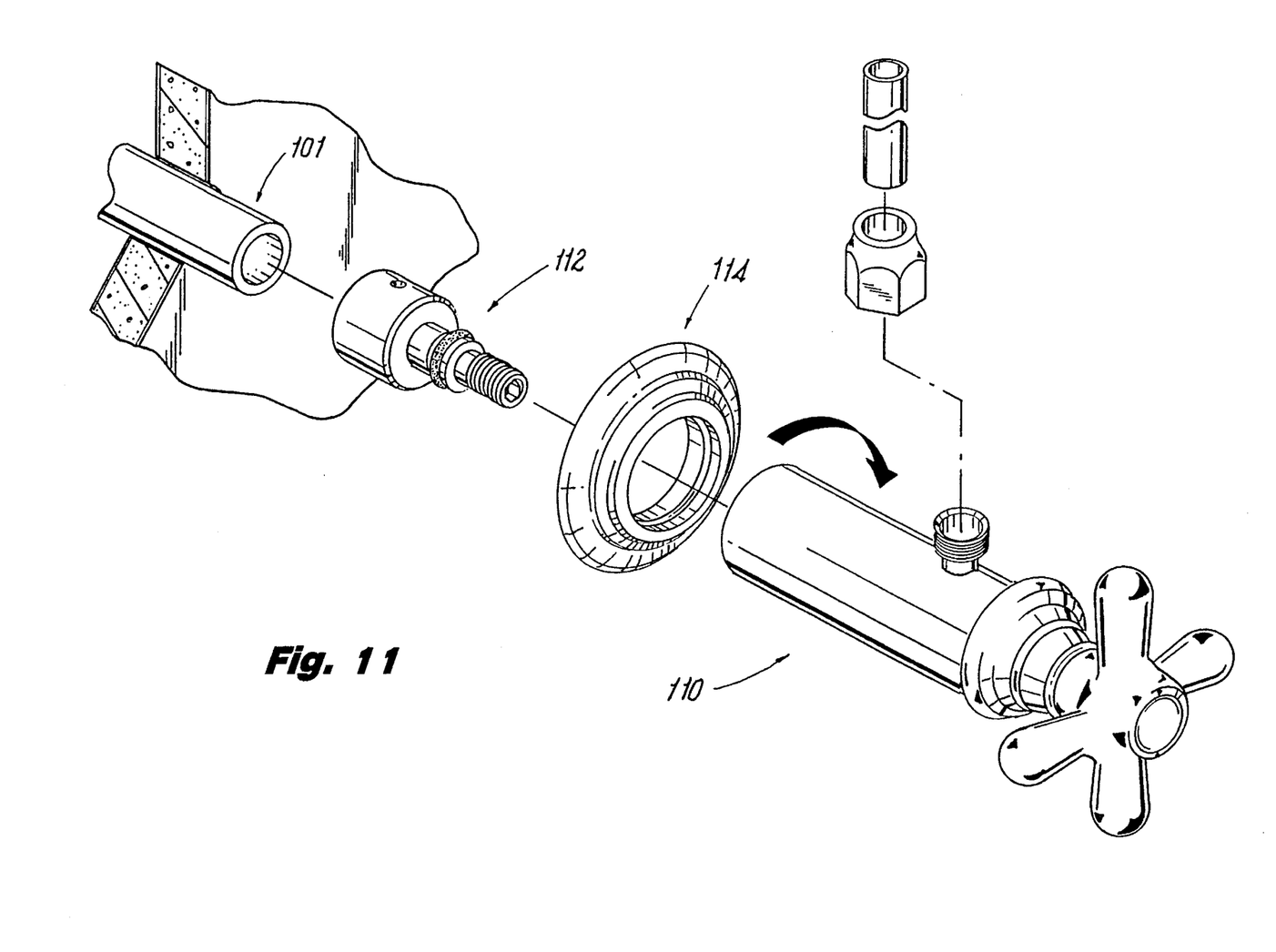
FIG. 11 is an exploded perspective view of an embodiment for an improved inlet stop assembly with a solder attachment.

FIG. 11 shows an exploded view of an alternate embodiment of improved inlet stop fixture assembly for attachment to a copper tube 101 extending from a wall 103, such as a ½" sweat coupling. In FIG. 11, the inlet stop body 110 is substantially identical to inlet stop fixture 10 used for a pipe thread installation in FIG. 4. Alternately, water inlet tube extension 112 is a different version used for the solder connection, however, the front end coupling to the valve assembly is similar.

Figure 12:
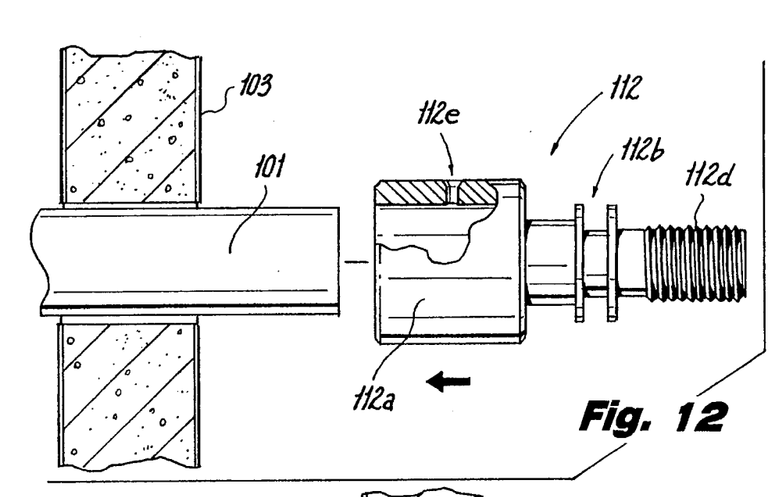
FIG. 12 is an exploded side elevational view in partial cross section of the water inlet tube extension with a solder attachment as in FIG. 11.

FIG. 12 shows the water inlet tube extension 112 in partial cross section. O-ring 112c is temporarily removed from O-ring collar 112b in preparation for the soldering operation. Since sweating a joint next to a finished wall is always a troublesome operation, a solder hole 112e is provided in water inlet tube extension 112, which places the solder application away from the wall 103 and reduces the chances of heat damage to the wall surface.

Figure 13:
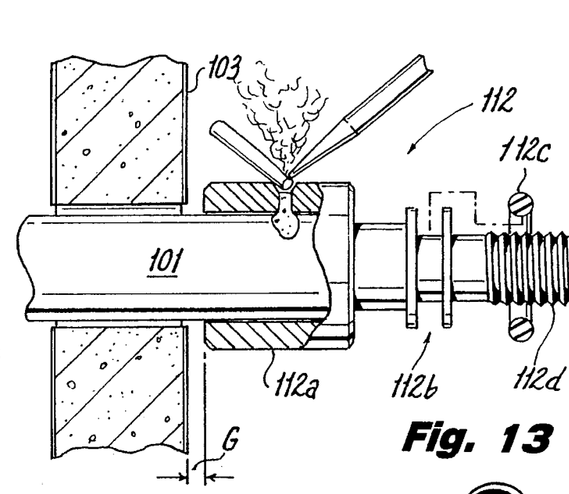
FIG. 13 is a side elevational view in partial section of the solder application of the water inlet tube extension as in FIG. 11; and, FIG. 14 is a side elevational view of the completed installation of the water inlet tube extension as in FIG. 11.

FIG. 13 shows the application of the solder through the solder hole 112e. Capillary action enhanced by use of the proper flux completes the sealing of this joint. After water inlet tube extension 112 is cool, O-ring 112b is replaced prior to twisting of inlet stop body 110 on as described above.

Figure 14:
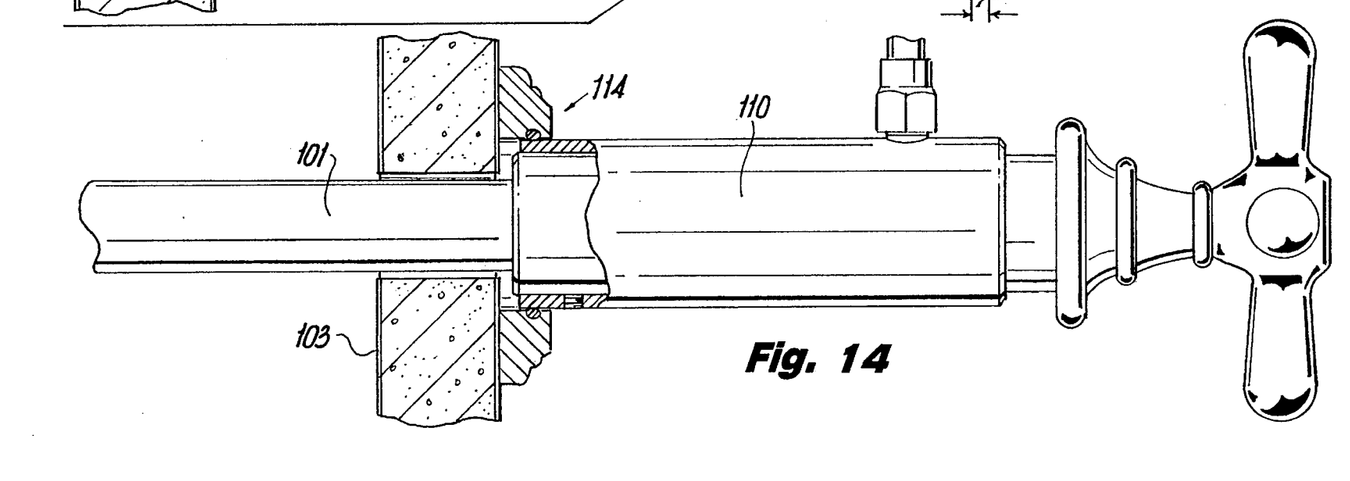

FIG. 14 shows a side view of the completed installation in partial cross section showing the fit of the escutcheon 114 against the wall 103.

It is noted that other modifications may be made to the present invention, without departing from the scope of the present invention, as noted in the appended claims.

We claim:

1. An improved wall mount inlet stop comprising:

an inlet stop body engagable with a water inlet tube protruding through a vertical wall, said inlet stop body being engagable to an intermediate water inlet tube extension, said water inlet tube extension attachable between said water inlet tube and said inlet stop body, said water inlet tube extension having at a distal end thereof a coupling portion engagable over the water inlet tube extending through the vertical wall, said water inlet tube extension further having an inlet coupling section at a proximal end therefore engagable within said inlet stop fixture, said hollow bore of said inlet stop body further having a water tight seal, said seal comprising an O-ring compressible against a root of an O-ring collar of said water inlet tube extension in a sliding seal relationship.

2. The improved wall mount inlet stop fixture as in claim 1, wherein said distal end of said water inlet tube extension is threaded onto the water inlet tube that extends through the vertical wall.

3. The improved wall mount inlet stop fixture as in claim 1, wherein said distal end of said water inlet tube extension is soldered onto the water inlet tube that extends through the vertical wall.

4. The improved wall mount inlet stop fixture as in claim 1, wherein said inlet stop body fits over said water inlet tube extension, said inlet stop body having a hollow bore area therein, said water inlet tube extension engagable within said hollow bore area of said inlet stop body at said proximal end of said water inlet tube extension.

5. The improved wall mount inlet stop fixture as in claim 4, further comprising said hollow bore area of said inlet stop body having a plurality of female threads engagable with male coupling threads of said water inlet tube extension.

6. The improved wall mount inlet stop fixture as in claim 4, further comprising a set screw transversely through said inlet stop body to engage a setting against an outer surface of an inlet coupling section of said water inlet tube extension.

* * * * *